US009785904B2

(12) United States Patent
Feder et al.

(10) Patent No.: US 9,785,904 B2
(45) Date of Patent: Oct. 10, 2017

(54) METHODS AND SYSTEMS FOR DEMONSTRATING AND APPLYING PRODUCTIVITY GAINS

(75) Inventors: Patrick C. Feder, San Francisco, CA (US); Michael J. Burris, Plano, TX (US)

(73) Assignee: Accenture Global Services Limited, Dublin (IE)

( * ) Notice: Subject to any disclaimer, the term of this patent is extended or adjusted under 35 U.S.C. 154(b) by 405 days.

(21) Appl. No.: 12/786,795

(22) Filed: May 25, 2010

(65) Prior Publication Data

US 2011/0295652 A1    Dec. 1, 2011

(51) Int. Cl.
*G06Q 10/00* (2012.01)
*G06Q 10/06* (2012.01)

(52) U.S. Cl.
CPC ....... *G06Q 10/0639* (2013.01); *G06Q 10/067* (2013.01); *G06Q 10/06313* (2013.01); *G06Q 10/06375* (2013.01)

(58) Field of Classification Search
CPC ......... G06Q 10/0639; G06Q 10/06375; G06Q 10/067; G06Q 10/0613
See application file for complete search history.

(56) References Cited

U.S. PATENT DOCUMENTS

| | | | | |
|---|---|---|---|---|
| 5,189,606 | A * | 2/1993 | Burns et al. | 705/7.23 |
| 5,880,959 | A * | 3/1999 | Shah et al. | 700/97 |
| 5,918,219 | A * | 6/1999 | Isherwood | 705/37 |
| 6,256,773 | B1 * | 7/2001 | Bowman-Amuah | 717/121 |
| 6,715,130 | B1 * | 3/2004 | Eiche | G06F 8/10 705/7.38 |
| 6,775,647 | B1 * | 8/2004 | Evans et al. | 703/7 |
| 6,865,567 | B1 * | 3/2005 | Oommen et al. | |
| 7,676,490 | B1 * | 3/2010 | Cassone et al. | 707/805 |
| 7,899,721 | B2 * | 3/2011 | Bowman-Amuah | 705/35 |
| 7,949,663 | B1 * | 5/2011 | Cassone et al. | 707/750 |
| 7,971,180 | B2 * | 6/2011 | Kreamer et al. | 717/101 |
| 8,032,404 | B2 * | 10/2011 | Lee et al. | 705/7.17 |
| 8,332,331 | B2 * | 12/2012 | Thywissen | G06Q 30/0283 705/35 |
| 8,407,078 | B1 * | 3/2013 | Caputo et al. | 705/7.27 |
| 8,464,263 | B2 * | 6/2013 | Lotlikar | G06F 9/5027 718/102 |

(Continued)

OTHER PUBLICATIONS

Froese Thomas Michael, 1992, Integrated Computer-Aided Project Management Through Standard Object-Oriented Models, Standford University, pp. 1-268.*

*Primary Examiner* — Matthew Gart
*Assistant Examiner* — Stephen S Swartz
(74) *Attorney, Agent, or Firm* — Brinks Gilson & Lione (57) ABSTRACT

The difference between estimated costs predicted for performing a first workscope and actual costs for performing the first workscope is determined. The model used to generate the estimated costs is adjusted to compensate for the difference, resulting in an improved model. Before beginning a second scope of work that is comparable to the first workscope, the improved model is used to predict estimated costs and a price for the second workscope. The estimated costs for the second workscope include predicted productivity gains. The price for the second workscope can be reduced relative to the price for the first workscope as a result of the improved model and the predicted productivity gains.

18 Claims, 3 Drawing Sheets

(56) References Cited

U.S. PATENT DOCUMENTS

| | | | |
|---|---|---|---|
| 8,489,514 B2* | 7/2013 | Keene | 705/308 |
| 2002/0049621 A1* | 4/2002 | Bruce | G06Q 10/06 |
| | | | 705/7.26 |
| 2002/0147681 A1* | 10/2002 | Taninaka et al. | 705/40 |
| 2003/0070157 A1* | 4/2003 | Adams | G06F 8/77 |
| | | | 717/101 |
| 2004/0044600 A1* | 3/2004 | Chu et al. | 705/34 |
| 2004/0199805 A1* | 10/2004 | Yasunaga | 714/2 |
| 2004/0267595 A1* | 12/2004 | Woodings | G06Q 10/06 |
| | | | 705/7.14 |
| 2005/0114828 A1* | 5/2005 | Dietrich et al. | 717/101 |
| 2006/0041857 A1* | 2/2006 | Huang et al. | 717/104 |
| 2006/0100919 A1* | 5/2006 | Levine | G06Q 10/04 |
| | | | 379/88.21 |
| 2007/0299698 A1* | 12/2007 | Anandarao et al. | 705/4 |
| 2008/0312979 A1* | 12/2008 | Lee | G06Q 10/06311 |
| | | | 705/7.28 |
| 2009/0012809 A1* | 1/2009 | Beckers | 705/1 |
| 2009/0106321 A1* | 4/2009 | Das | G06F 17/30463 |
| 2009/0157563 A1* | 6/2009 | Serbin et al. | 705/36 R |
| 2009/0204551 A1* | 8/2009 | Wang et al. | 705/400 |
| 2009/0248462 A1* | 10/2009 | DeGard | G06Q 10/10 |
| | | | 705/7.11 |
| 2010/0174573 A1* | 7/2010 | Zimmerman et al. | 705/7 |
| 2011/0166849 A1* | 7/2011 | Dube et al. | 703/23 |

* cited by examiner

METHODS AND SYSTEMS FOR DEMONSTRATING AND APPLYING PRODUCTIVITY GAINS

BACKGROUND

Clients and third party administrators generally outsource tasks and services, such as information technology (IT) services, to an outside company (a supplier or service provider) that specializes in that type of work. The services performed by the service provider for a particular client may change from year to year, but there are often scopes of work—which may be relatively large—that do not change much from one year to the next or that are very similar to a scope of work performed by the service provider for another one of its clients.

Consequently, over time, the service provider would be expected to perform a particular scope of work more efficiently and economically than it did in the past. Furthermore, a client might expect to share in any of the service provider's productivity gains in the form of reduced prices.

However, measuring and demonstrating productivity gains can be difficult. In particular, it is difficult to predict productivity gains for an upcoming service period. Service providers may commit to refunding a portion of their charges after a workscope is completed if they can perform that workscope more efficiently or economically than was anticipated when that workscope was priced. However, a service provider that can predict productivity gains in advance of performing the work would have an advantage over its competitors by virtue of being able to offer a lower upfront price (instead of a potential refund), thus allowing their clients to realize a cost-savings sooner rather than later.

SUMMARY

Embodiments according to the present invention pertain to methods and systems for demonstrating and applying productivity gains. In one embodiment, the difference between estimated costs predicted for performing a first workscope and actual costs for performing the first workscope is determined. A model used to generate the estimated costs is adjusted to compensate for the difference, resulting in an improved model. Before beginning a second scope of work that is comparable to the first workscope, the improved model is used to predict estimated costs and a price for the second workscope. The estimated costs for the second workscope include predicted productivity gains. The price for the second workscope can be reduced relative to the price for the first workscope as a result of the improved model and the predicted productivity gains.

Productivity gains for application outsourcing activities, including maintenance and operations, enhancements, and new system development, can be measured and demonstrated for input-based deals (e.g., time and material deals) as well as output-based deals (e.g., firm/fixed price deals).

These and other objects and advantages of the present invention will be recognized by one skilled in the art after having read the following detailed description, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention. Like numbers denote like elements throughout the drawings and specification.

DETAILED DESCRIPTION

In the following detailed description of embodiments according to the present invention, numerous specific details are set forth in order to provide a thorough understanding of those embodiments. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "determining," "generating," "adjusting," "predicting," "estimating," "comparing," "measuring," "setting," "tracking" or the like, may refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Figure 1:
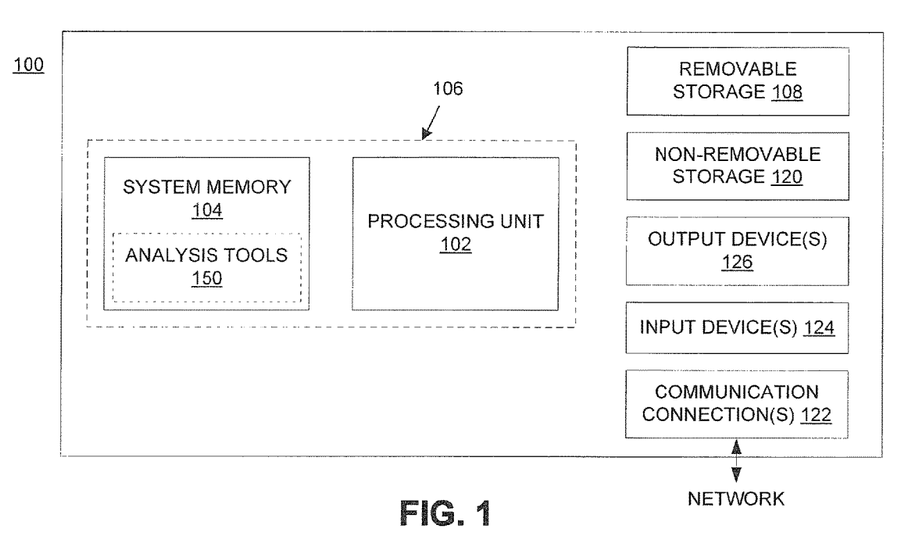
FIG. 1 is a block diagram of an example of a computer system upon which embodiments of the present invention can be implemented.

FIG. 1 shows a block diagram of an example of a computer system 100 upon which the embodiments described herein may be implemented. In its most basic configuration, the system 100 includes at least one processing unit 102 and memory 104. This most basic configuration is illustrated in FIG. 1 by dashed line 106. The system 100 may also have additional features/functionality. For example, the system 100 may also include additional storage (removable and/or non-removable) including, but not limited to, magnetic or optical disks or tape. Such additional storage is illustrated in FIG. 1 by removable storage 108 and non-removable storage 120. The system 100 may also contain communications connection(s) 122 that allow the device to communicate with other devices.

Generally speaking, the system 100 includes at least some form of computer-usable media. Computer-usable media can be any available media that can be accessed by the system 100. By way of example, and not limitation, computer-usable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed by the system 100. Any such computer storage media may be part of the system 100. The memory 104, removable storage 108 and non-removable storage 120 are all examples of computer storage media.

Communication media can embody computer-readable instructions, data structures, program modules or other data and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media. The communications connection(s) 122 is/are an example of communication media.

The system 100 may also have input device(s) 124 such as keyboard, mouse, pen, voice input device, touch input device, etc. Output device(s) 126 such as a display, speakers, printer, etc., may also be included.

The system 100 may operate in a networked environment using logical connections to one or more remote computers. When used in a networking environment, the system 100 can be connected to the network through the communication connection(s) 122.

In the example of FIG. 1, the memory 104 includes computer-readable instructions, data structures, program modules and the like associated with analysis tools 150. However, the analysis tools 150 may instead reside in any one of the computer storage media used by the system 100, or may be distributed over some combination of the computer storage media, or may be distributed over some combination of networked computers. Elements and functionalities associated with the analysis tools 150 are described further in conjunction with FIGS. 2, 3, and 4.

Figure 2:
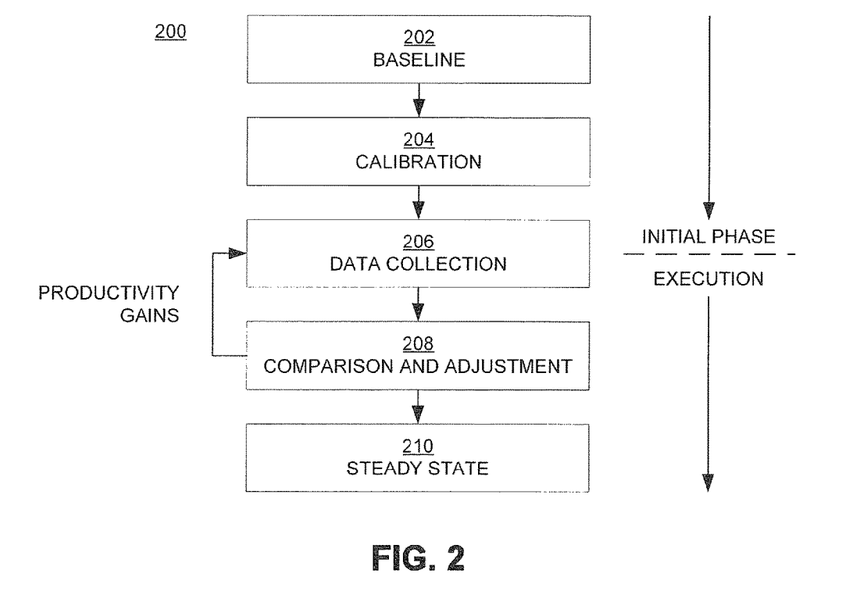
FIG. 2 is a block diagram illustrating a process for demonstrating and applying productivity gains according to an embodiment of the invention.

FIG. 2 is a block diagram illustrating a process 200 for demonstrating and applying productivity gains according to an embodiment of the invention. In general, the process 200 is employed to measure and quantify the actual effort (e.g., costs) needed to perform a scope of work; to compare the actual costs to the estimated costs; to use the actual costs to refine the estimation model (the model used to estimate costs); to estimate the costs needed to perform that workscope (or a comparable one) the next time (e.g., next year); and to demonstrate that the workscope may be performed at less cost as a result of both the refined estimation model and productivity gains. The resulting benefits can be passed on to the customer—for example, a service provider can offer a better price to the customer. Also, by committing to a lower price—for example, by committing to perform a certain workscope for a lower price than the previous year, or by committing to lower the price for that workscope year-by-year—the service provider assumes some risks from the client.

In the example of FIG. 2, the process 200 is divided into an initial phase and an execution phase. The initial phase includes the baseline block 202, the calibration block 204, and the data collection block 206. The data collection block 206 continues into the execution phase—in the initial phase, data is collected while a particular workscope is executed for the first time; and during the execution phase, data is collected when that particular workscope is subsequently executed. The execution phase also includes a comparison and adjustment block 208. The execution phase concludes with the steady state block 210. Before steady state is reached, the data collection block 206 and the comparison and adjustment block 208 can be repeated, perhaps more than once.

Figure 3:
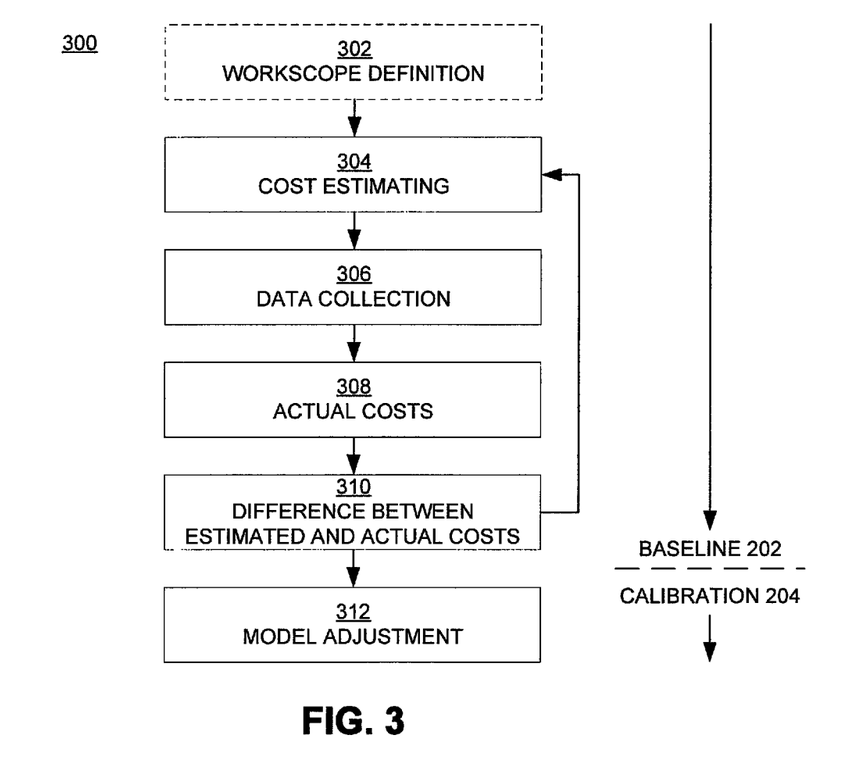
FIG. 3 is a block diagram illustrating a baseline and calibration process according to an embodiment of the invention.

FIG. 3 is a block diagram that provides further details regarding the baseline block 202 and the calibration block 204 according to an embodiment of the invention. In block 302, a particular workscope is defined for a particular customer. In one embodiment, the workscope includes tasks associated with IT services. Such tasks may include, but are not limited to, the development, implementation, maintenance, and enhancement of customized Web sites and screens, enterprise applications, database applications, other types of software applications, etc., as well as infrastructure (hardware) support. The workscope reflects requirements specific to the customer.

In block 304, the cost of the workscope is estimated using a proprietary estimation model. In block 306, while the workscope is being executed, data is collected using a proprietary time-tracking tool that measures the time and costs associated with each task of the workscope. In block 308, the total amount of actual time and costs are compiled when the workscope is completed.

In block 310, the difference between the estimated and actual costs is determined. Blocks 304, 306, 308, and 310 can be repeated over the duration of the baselining period. In other words, the baselining period may not end when the workscope is completed. The workscope may be repeatedly executed over one or more (subsequent) periods of time or for one or more other customers.

In block 312, once the baselining period is completed, the estimation model used in block 304 can be calibrated (adjusted) using the actual cost data. For example, estimating factors used in the model can be adjusted (reduced or increased) so that the model will serve as a more accurate predictor of costs the next time the same workscope (or a comparable workscope) is to be performed. The average cost for each task, project, or application included in the workscope can also be determined for future use in the estimation model.

Returning now to FIG. 2, once the baseline and calibration steps are completed, productivity improvements can be demonstrated and applied during the execution phase. As noted above, data collection continues during the execution phase. The collected data—which reflects actual costs—is compared to the estimated costs, and the estimation model can be adjusted as mentioned above. Each time a particular workscope is executed, data representing actual costs is collected and compared to the estimated costs for that workscope, and the estimation model is refined (improved). By comparing estimated costs versus actual costs, productivity gains can be validated and quantified. If actual costs are less than or equal to the estimated costs, then the anticipated productivity gains are realized and the productivity commitment to the customer is demonstrated.

Productivity gains can be input-based or output-based. That is, productivity gains can be measured and demonstrated for input-based deals (e.g., time and material deals) as well as output-based deals (e.g., firm/fixed price deals). For input-based deals, productivity gains can be demonstrated by reducing the estimated number of hours and/or material costs associated with a scope of work, resulting in a lower price for that workscope. For output-based deals, productivity gains can be demonstrated by reducing the price of a scope of work.

Eventually, refinements to the estimation model are no longer needed, or are not significant, in which case the process 200 enters the steady state block 210. "Steady state" does not necessarily mean that the price or level of effort (costs) have reached a steady state. Rather, the use of "steady state" in the process 200 means that the development of the estimation model has matured to the point at which it has become an accurate predictor of the workscope of interest, and that further refinements to the model may no longer be needed or possible for the workscope evaluated during the baselining period.

Once the steady state block 210 is reached, productivity gains for future applications of the workscope of interest can be determined/predicted and used as the basis for price reductions. For example, when estimating the cost of a task in the workscope, it may be possible to assign fewer man-hours to that task, thus lowering the cost and hence the price of that task. Alternatively, it may be possible to assign a less experienced person—someone with a lower hourly rate—to that task; that person may not be able to complete the task as quickly as a more experienced person, but the cost for performing the task is not increased because of the lower hourly rate.

If there is some commonality between two workscopes, the baselining period applied to one workscope may be applied to the other workscope. At the least, the first workscope's baseline can be used as a foundation for baselining the second workscope, so that the baselining period for the second workscope may be completed more quickly. Also, the baseline (or selected baseline data) from one workscope for one customer can be transferred and used to baseline a workscope for another customer, providing a competitive advantage as well other advantages (e.g., improved efficiency, etc.) because the baselining period for the other customer can be shortened.

Baselining—specifically, data collection—can be performed at different levels of granularity. For example, a group of applications may be baselined, or each application in the group can be individually baselined, or each module within each application can be individually baselined.

Figure 4:
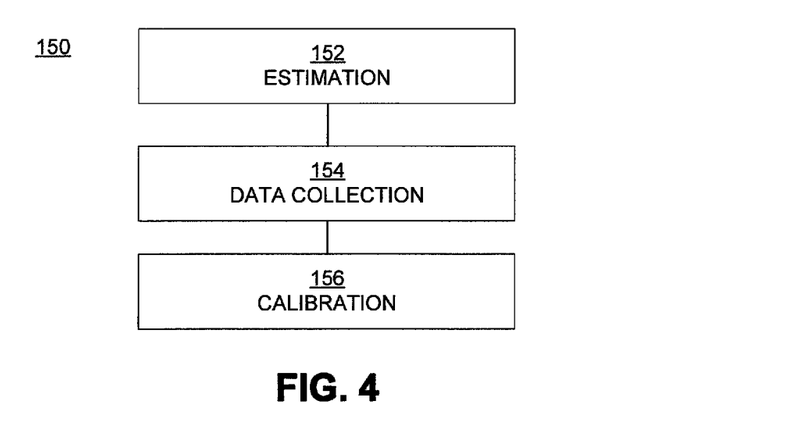
FIG. 4 is a block diagram showing elements of an analysis tool according to an embodiment of the invention.

FIG. 4 is a block diagram showing elements of the analysis tools 150 according to an embodiment of the invention. In the example of FIG. 4, the analysis tools 150 include an estimation module 152 that can be used to predict estimated costs for performing a first scope of work. The analysis tools 150 can also include a data collection module 154 that can be used to track actual costs for performing the first scope of work. The analysis tools 150 can also include a calibration module 156 that can be used to determine the difference between the estimated costs and the actual costs, and to adjust the estimation module 152 to compensate for the difference.

The data collection module 154 can also be used to track actual costs for performing a second scope of work, in which case the calibration module 156 can also be used to compare the actual costs for performing the second scope and the estimated costs for the second scope.

The modules 152, 154, and 156 can be integrated with one another such that outputs from one module can serve as inputs to one or more of the other modules.

Using the processes and models described above, a service provider or supplier can demonstrate productivity gains through delivery of the same scope (volume) of work with less effort (improved productivity), resulting in lower costs and hence lower price. In general, productivity can be measured for both hours worked (work effort) and the pyramid of resources generally applicable to each type of work (average pyramid). The "pyramid of resources" refers to the different levels of experience and pay associated with human resources—more experience generally means higher pay (cost).

In general, in one embodiment, a service provider may break down the productivity focus into the following areas: enhancements, maintenance, development, and infrastructure/production support. Examples elaborating on the demonstration and application of productivity gains in some of these areas are presented below.

In the area of enhancements, a service provider can work with a client to determine the baseline categories during the baselining process. Examples of baseline categories for enhancements are as follows minor enhancements—e.g., enhancements that are less than or equal to 40 hours;

medium enhancements—e.g., enhancements that are more than 40 hours and less than 100 hours; and complex enhancements—e.g., enhancements that are 100 hours or more. For complex enhancements, the maximum can be agreed upon as part of the baselining process.

The service provider and client can document both the number of hours per typical enhancement in each of the three categories above and the typical pyramid of resources that performs each of the three enhancement types. Once the baselining period is completed, the service provider can begin to report periodically the actual pyramid and hours per enhancement type, and can compare that result to the initial baseline. After the baselining period is over (e.g., in the next year of the contract with the client), the service provider can apply the agreed productivity improvements to each of the three enhancement categories.

In the area of maintenance, productivity gains can be harvested through reduction of effort required for maintenance activities over time. The client and service provider can work together to define the components for measuring maintenance productivity. Maintenance includes, for example, fixing incidents with and without code changes, preventative maintenance, and backlog work. Since each software application may have a different maintenance profile, each application can be treated as a component.

For maintenance, the service provider can work with the client to baseline the work activities during the first year of operations so that those parties know and agree on the average number of hours for each work component and the average pyramid utilized to deliver each type of work. Once the provider and client know the baseline per function, the provider can begin reporting periodically (e.g., monthly) to the client and can compare the results to the expected baseline for each work type. After the baseline period is over, the provider can measure the productivity gains on a periodic (e.g., annual) basis.

In the development area, productivity can be harvested through reduction of effort required for each element or component completed as part of a development project. These reductions can be demonstrated through baselining and then by reducing the effort per element in the estimating model. The provider can then verify that, in total, the effort per element has been reduced by the agreed upon annual expectation. The client and provider can work together to define the types of development. Examples would include:
 small development projects (e.g., 500 to 1,500 hours);
 medium development projects (e.g., 1,500 to 3,500 hours); and
 large development projects (e.g., more than 3,500 hours).

Development project effort (e.g., costs) can be estimated using the tools and models discussed above. As mentioned, those tools can be calibrated during the baselining period. The service provider can capture both the number of hours and average pyramid necessary to do each type (factor) of work. Examples of development factors include, for example, the number of:
 acquired components;
 application pages;
 application simulation products;
 batch programs;
 business processes;
 page templates;
 conversions;
 custom components;
 data access classes;
 database tables;
 external interfaces;
 integrating applications;
 reports;
 stored procedures;
 user interface classes;
 utility classes;
 vendors; and
 work based training courses.

The above factors can be baselined by project phase (e.g., analyze, design, build, test, deploy, etc.). The calibration of the analysis tools can be performed jointly between the client and the provider. Once agreed upon, productivity gains can be applied to each factor.

In the area of infrastructure/production support, productivity can be harvested, for example, by reducing the average time spent working each provider-closed ticket in a client service center year over year, or by baselining the work required to support the number of desk top computers and servers. The provider can capture both the number of hours by work type and the average pyramid to complete that work type. Once the baselining is completed, the provider can begin reporting periodically (e.g., annually) the actual hours and pyramid versus the expected baseline, and productivity can be measured in accordance with the methods outlined above.

Work type can be subdivided as follows:
 team extension work;
 independent delivery work; and
 full ownership work.

Once the baselining period is completed, work in subsequent periods (e.g., the next year) can be compared in aggregate to the baseline objectives. For example, all of the work types (e.g., enhancements, maintenance, development, and infrastructure/production support) can be totaled together with the actual costs (hours and resource pyramid) and compared to the baseline objectives/costs (hours and pyramid). Some of those objectives/costs will be exceeded, and some of the objectives/costs will be under the expected targets. The provider and client can agree on a metric (a value plus or minus a deadband) that defines whether or not the provider has met its objective. For example, when all of the work types are added together, the provider can be judged as having met its objective if the sum of all work is at or below the defined annual expectation plus or minus two percent.

Figure 5:
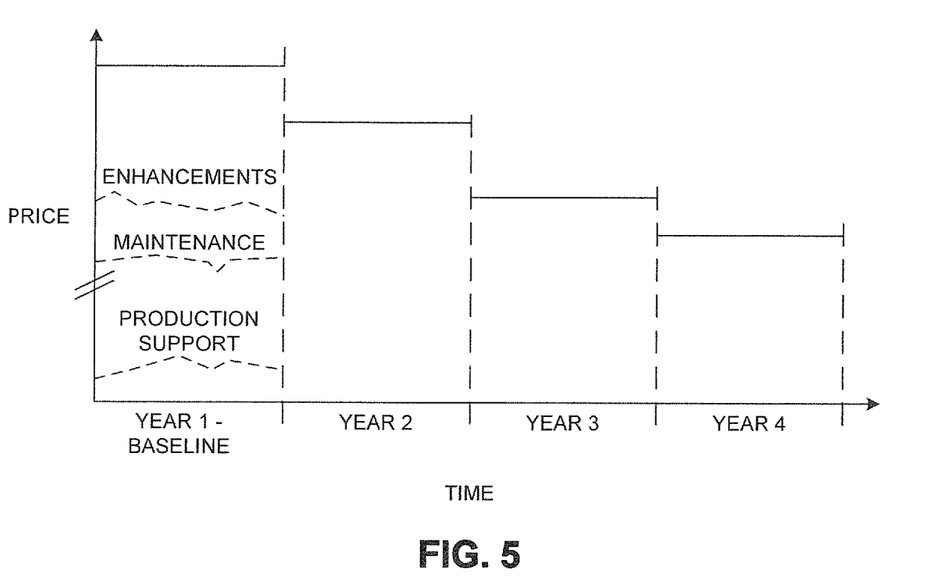
FIG. 5 is a timeline illustrating an example of price versus time according to embodiments of the invention.

FIG. 5 is a timeline illustrating an example of price versus time according to embodiments of the invention. The charge to the client is based on price (for a fixed price deal) or pyramid rates (hourly rates) times the quantity of hours (for time and material deals). In the example of FIG. 5, baselining occurs in the first year for the different types of work (e.g., enhancements, maintenance, and production support) to establish a total price baseline across all of the types of work. In subsequent years, the service provider commits to a certain amount of productivity improvements (within a deadband), resulting in a price reduction each year. Accordingly, for output-based (firm/fixed price) deals, a price is initially defined for a defined workscope and output, with commitments to productivity gains resulting in a constant level of output delivered at a reduced price over time. Similarly, for input-based (time and material) deals, total charges to the client based on pyramid rates and the quantity of hours worked can be reduced over time.

Figure 6:
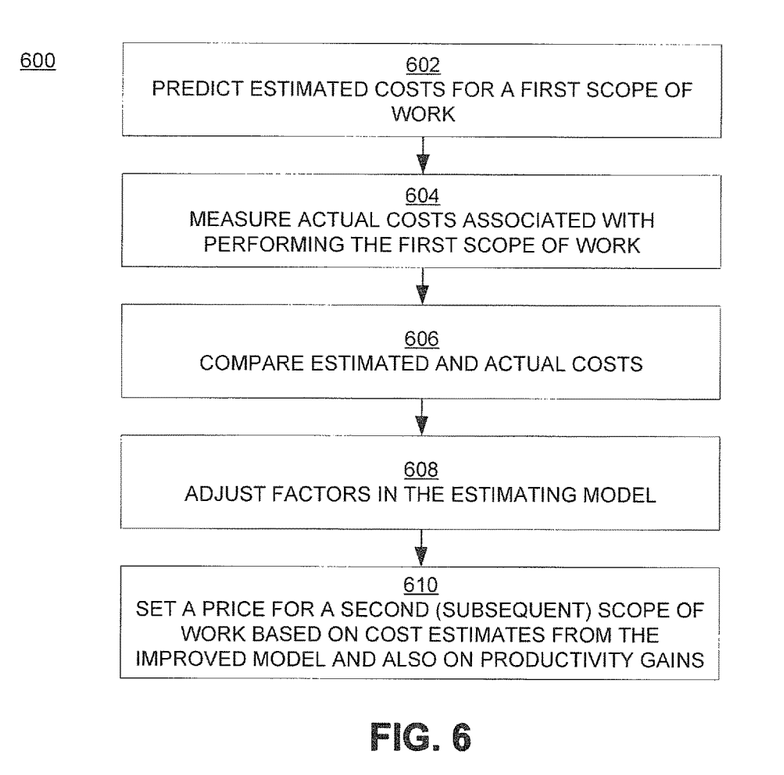
FIG. 6 is a flowchart of a method for demonstrating and applying productivity gains according to an embodiment of the invention.

FIG. 6 is a flowchart 600 summarizing the methods for demonstrating and applying productivity gains described above. Although specific steps are disclosed in the flowchart 600, such steps are examples only. That is, various other steps or variations of the steps recited in the flowchart 600 can be performed. The steps in the flowchart 600 may be performed in an order different than presented. In one embodiment, the flowchart 600 is implemented as computer-readable instructions stored in a computer-usable medium.

In block 602, estimated costs for a first scope of work are predicted with an estimation model. In block 604, actual costs associated with performing the first scope of work are measured. In block 606, the actual costs are compared to the estimated costs. In block 608, factors utilized in the estimation model are adjusted based on results of the comparison, in order to produce an improved model.

In block 610, before beginning a second scope of work that is comparable to the first scope of work, a price is set. The price is based on estimated costs for the second scope of work that are generated using the improved model, including predicted productivity gains. Accordingly, the price can be reduced relative to the price for the first scope of work as a result of the improved model and the predicted productivity gains.

Subsequently, actual costs for performing the second scope of work can be compared to the estimated costs for the second scope to further adjust the factors used in the estimation model.

In summary, embodiments according to the present invention provide methods and systems for measuring and demonstrating productivity gains. In particular, productivity gains can be predicted for an upcoming service period. Thus, a service provider can advantageously predict productivity gains in advance of performing the work and can offer a lower upfront price, thus allowing their clients to realize a cost-savings sooner rather than later.

The foregoing descriptions of specific embodiments according to the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system comprising:
   a processor;
   a communication interface in communication with the processor; and
   a memory in communication with the processor, the memory comprising a prediction tool executed by the processor, the prediction tool including:
      a cost estimation model configured to generate a predicted cost estimate for performing a first project having a first workscope; and
      instructions for execution by the processor, the instructions causing the processor to, when executed by the processor:
         receive, via the communication interface, project data for the first project that includes worker tasks and requirements that define the first workscope; and
         store in memory the project data for the first project;
         determine baseline data for developing the cost estimation model, the instructions causing the processor to:
            apply the cost estimation model to the project data stored for the first project to generate the predicted cost estimate for performing the first project;
            collect actual cost data via the communication interface that represents an actual cost for performing the first project; and
            determine a cost difference between the predicted cost estimate and the actual cost for performing the first project;
         develop the cost estimation model by calibrating the cost estimation model responsive to the baseline data including the cost difference;
         continue to obtain baseline data and develop the cost estimation model responsive to additional projects until the cost estimation model has reached steady state by:
            1) causing the processor to perform a baselining iteration configured to, for each specific project among the additional projects:
               apply the cost estimation model to that specific project to generate a predicted cost estimate for performing that specific project;
               collect project actual cost data via the communication interface that represents actual cost of that specific project; and
               determine a cost difference between the predicted cost estimate for performing that specific project and the actual cost of that specific project; and
            2) after the baselining iterations, calibrating the cost estimation model responsive to the baseline data obtained during the baselining iterations including the cost differences for the specific projects;
         after the steady state is reached, determine a second project with a second workscope that is different than the first workscope, and for which the processor will execute the cost estimation model of the prediction tool in the memory;
         determine that there is commonality between the first workscope for the first project and the second workscope for the second project;
         responsive to determining that there is commonality, transfer the baseline data to the second project to create a baseline foundation for baselining the second workscope, thereby allowing the processor to more quickly complete a baselining period for the second workscope and thereby improving baselining efficiency for the second workscope by reducing resource expenditure including baselining processing time for the second workscope in connection with processor execution of the cost estimation model of the prediction tool in the memory for the second workscope;
         create an offer for performing the second project, the offer obtained by application of the cost estimation model after calibration to the second project; and
         communicate the offer to a recipient through the communication interface.

2. The system of claim 1, where the steady state is reached when the cost estimation model achieves a pre-determined accuracy in generating predicted cost estimates with the cost estimation model.

3. The system of claim 1, where:
   the first workscope comprises an enhancement of an information technology service for a particular customer, the instructions further configured to identify the enhancement as a minor enhancement, a medium enhancement, or a complex enhancements, and
   the cost estimation model comprises a baseline for each of the minor enhancement, the medium enhancement, and the complex enhancement, the baseline comprising a pre-defined number of hours and a pre-defined resource period for each of the minor enhancement, the medium enhancement, and the complex enhancement.

4. The system of claim 1, where the instructions are further configured to:
   determine that a productivity commitment is demonstrated to the recipient.

5. The system of claim 1, where the instructions are further configured to:
   compile a total amount of actual time and costs for each task of multiple tasks associated with the first workscope when the first project is completed.

6. The system of claim 1, where the instructions are further configured to determine a productivity gain for the second project relative to the first project by:
   determining a difference between a work effort for the first workscope and a work effort for the second workscope, and
   determining a difference between a first pyramid of resources for the first workscope and a second pyramid of resources for the second workscope.

7. The system of claim 6, where the first and second pyramids of resources each comprises:
   multiple levels of experience of personnel performing tasks involved in the first and second workscopes and arranged to form the first and second pyramids, and
   pay associated with the personnel performing the tasks involved in the first and second workscopes.

8. The system of claim 1, where the first workscope comprises a development project, and the instructions are further configured to:
   assign a particular baseline category to the development project selected from at least:
      a small development project category characterized by a first pre-defined range of hours of work;
      a medium development project category characterized by a second pre-defined range of hours of work; and
      a large development project category involving more than a large project threshold amount of hours of work; and
   determine the productivity gain according to the particular baseline category.

9. The system of claim 1, where the memory further comprises a baseline for the first workscope, and the instructions are further configured to:
   generate the baseline for the first workscope by analyzing:
      an average number of hours consumed by each task of multiple tasks for performing the first project, the average number of hours based on a predetermined baselining period during which the first project is repeatedly performed, and
      an average resource pyramid utilized by tasks performed during the predetermined baselining period; and
   calibrate the cost estimation model by compensating for a difference between the baseline and actual costs for performing tasks of the multiple tasks for performing the first project.

10. A computer-implemented method comprising:
    generating, by a processor, a predicted cost estimate for performing a first project having a first workscope using a cost-estimation model of a prediction tool stored in a memory that is in communication with the processor;
    receiving, via the communication interface, project data for the first project that includes worker tasks and requirements that define the first workscope;
    storing in memory the project data for the first project;
    determine baseline data for developing the cost estimation model by:
       applying, by the processor, the cost estimation model to the project data stored for the first project to generate the predicted cost estimate for performing the first project;
       collecting actual cost data via the communication interface in communication with the processor, which represents an actual cost for performing the first project; and
       determining, by the processor, a cost difference between the predicted cost estimate and the actual cost for performing the first project;
    developing the cost estimation model by calibrating, by the processor, the cost estimation model responsive to the baseline data including the cost difference;
    continue to obtain baseline data and develop the cost estimation model responsive to additional projects until the cost estimation model has reached steady state by:
       1) causing the processor to perform a baselining iteration including, for each specific project among the additional projects:
          applying the cost estimation model to that specific project to generate a predicted cost estimate for performing that specific project;
          collecting project actual cost data via the communication interface that represents actual cost of that specific project; and
          determining a cost different between the predicted cost estimate for performing that specific project and the actual cost of that specific project; and
       2) after the baselining iterations, calibrating the cost estimation model responsive to the baseline data obtained during the baselining iterations including the cost differences for the specific projects;
    after the steady state is reached, determine a second project with a second workscope that is different than the first workscope, and for which the processor will execute the cost estimation model of the prediction tool in the memory;
    determine that there is commonality between the first workscope for the first project and the second workscope for the second project;
    responsive to determining that there is commonality, transferring the baseline data to the second project to create a baseline foundation for baselining the second workscope, thereby allowing the processor to more quickly complete a baselining period for the second workscope and thereby improving baselining efficiency for the second workscope by reducing resource expenditure including baselining processing time for the second workscope in connection with processor execution of the cost estimation model of the prediction tool in the memory for the second workscope;
    creating an offer for performing the second project, the offer obtained by application of the cost estimation model after calibration to the second project; and
    communicating the offer to a recipient through the communication interface.

11. The method of claim 10, further comprising:
    determining, by the processor, that the cost estimation model has reached the steady state when the cost estimation model achieves a pre-determined accuracy in generating predicted cost estimates with the cost estimation model.

12. The method of claim 10, further comprising:
    determining, by the processor, a productivity gain for the second project relative to the first project by:
       determining a difference between a work effort for the first workscope and a work effort for the second workscope, and
       determining a difference between a first pyramid of resources for the first workscope and a second pyramid of resourcesfor the second workscope.

13. The method of claim 12, where the first and second pyramids of resources each comprises:

multiple levels of experience of personnel performing tasks involved in the first and second workscopes and arranged to form the first and second pyramids of resources, and pay associated with the personnel performing the tasks involved in the first and second workscopes.

14. The method of claim 10, where:

the first workscope comprises an enhancement of an information technology service for a particular customer, the instructions further configured to identify the enhancement as a minor enhancement, a medium enhancement, or a complex enhancements, and the cost estimation model comprises a baseline for each of the minor comprising a pre-defined number of hours and a pre-defined resource period for each of the minor enhancement, the medium enhancement, and the complex enhancement.

15. The method of claim 10, further comprising:

generating, by the processor, a baseline for the first workscope by analyzing:
  an average number of hours consumed by each task of multiple tasks for performing the first project, the average number of hours based on a predetermined baselining period during which the first project is repeatedly performed, and
  an average resource pyramid utilized by tasks performed during the predetermined baselining period; and
calibrating the cost estimation model by compensating for a difference between the baseline and actual costs for performing tasks of multiple tasks for performing the first project.

16. A product comprising:

a machine readable medium other than a transitory signal; and instructions of a prediction tool stored on the medium, the instructions configured for execution by a processor to:
  read a cost estimation model from a memory, the cost estimation model configured to generate a predicted cost estimate for performing a first project having a first workscope;
  receive, via the communication interface, project data for the first project that includes worker tasks and requirements that define the first workscope; and
  store in memory the project data for the first project;
  determine baseline data for developing the cost estimation model:
    apply the cost estimation model to the project data stored for the first project to generate the predicted cost estimate for performing the first project;
    collect actual cost data via a communication interface that represents an actual cost for performing the first project; and
    determine a cost difference between the predicted cost estimate and the actual cost for performing the first project;
  develop the cost estimation model by calibrating the cost estimation model responsive to the baseline data including the cost difference;
    continue to obtain baseline data and develop the cost estimation model responsive to additional projects until the cost estimation model has reached steady state by:
      1) causing the processor to perform baselining iterations configured to, for each specific project among the additional projects:
        apply the cost estimation model to that specific project to generate a predicted cost estimate for performing that specific project;
        collect project actual cost data via the communication interface that represents actual cost of that specific project; and
        determine a cost difference between the predicted cost estimate for performing that specific project and the actual cost of that specific project; and
      2) after the baselining iterations, calibrating the cost estimation model responsive to the baseline data obtained during the baselining iterations including the cost differences for the specific projects;
  after the steady state is reached, determine a second project with a second workscope that is different than the first workscope, and for which the processor will execute the cost estimation model of the prediction tool in the memory;
  determine that there is commonality between the first workscope for the first project and the second workscope for the second project;
  responsive to determining that there is commonality, transfer the baseline data to the second project to create a baseline foundation for baselining the second workscope thereby allowing the processor to more quickly complete a baselining period for the second workscope and thereby improving baselining efficiency for the second workscope by reducing resource expenditure including baselining processing time for the second workscope in connection with processor execution of the cost estimation model of the prediction tool in the memory for the second workscope;
  create an offer for performing the second project, the offer obtained by application of the cost estimation model after calibration to the second project; and
  communicate the offer to a recipient through the communication interface.

17. The product of claim 16, where the instructions are further configured to determine a productivity gain for the second project relative to the first project by:

determining a difference between a work effort for the first workscope and a work effort for the second workscope, and determining a difference between a first pyramid of resources for the first workscope and a second pyramid of resources for the second workscope.

18. The product of claim 16, where the instructions are further configured to:

generate a baseline for the first workscope by analyzing:
  an average number of hours consumed by each task of multiple tasks for performing the first project, the average number of hours based on a predetermined baselining period during which the first project is repeatedly performed, and
  an average resource pyramid utilized by tasks performed during the predetermined baselining period; and
calibrate the cost estimation model by compensating for a difference between the baseline and actual costs for performing tasks of the multiple tasks for performing the first project.

* * * * *

UNITED STATES PATENT AND TRADEMARK OFFICE
CERTIFICATE OF CORRECTION

PATENT NO. : 9,785,904 B2
APPLICATION NO. : 12/786795
DATED : October 10, 2017
INVENTOR(S) : Patrick C. Feder and Michael J. Burris Page 1 of 1

It is certified that error appears in the above-identified patent and that said Letters Patent is hereby corrected as shown below:

In the Claims

Claim 12, Column 12, Line 65, add a space between "resources" and "for".

Signed and Sealed this
Second Day of July, 2019

Andrei Iancu
*Director of the United States Patent and Trademark Office*